(12) United States Patent
Grabon

(10) Patent No.: US 11,506,406 B2
(45) Date of Patent: Nov. 22, 2022

(54) AIR HANDLING UNIT AND METHOD FOR CONTROLLING SUCH AN AIR HANDLING UNIT

(71) Applicant: Carrier Corporation, Palm Beach Gardens, FL (US)

(72) Inventor: Michel Grabon, Bressolles (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 185 days.

(21) Appl. No.: 16/910,872

(22) Filed: Jun. 24, 2020

(65) Prior Publication Data

US 2021/0003298 A1 Jan. 7, 2021

(30) Foreign Application Priority Data

Jul. 5, 2019 (EP) .................................. 19305923

(51) Int. Cl.
*F24F 5/00* (2006.01)
*F24F 3/044* (2006.01)

(52) U.S. Cl.
CPC ............ *F24F 5/0017* (2013.01); *F24F 3/044* (2013.01); *F24F 5/001* (2013.01)

(58) Field of Classification Search
CPC .......... F24F 5/0017; F24F 3/044; F24F 5/001; F24F 13/30; Y02B 30/52; Y02B 30/54
USPC ........................................................ 62/96
See application file for complete search history.

(56) References Cited

U.S. PATENT DOCUMENTS

| 7,658,079 | B2 | 2/2010 | Bailey et al. |
| 7,913,506 | B2 | 3/2011 | Bittner et al. |
| 8,505,324 | B2 | 8/2013 | Goodfellow |
| 9,179,580 | B2 | 11/2015 | Tozer |
| 9,338,928 | B2 | 5/2016 | Lehman |
| 9,581,364 | B2 | 2/2017 | Kopko |
| 9,909,790 | B2 | 3/2018 | Pham et al. |
| 9,999,163 | B2 | 6/2018 | Karrat et al. |

(Continued)

FOREIGN PATENT DOCUMENTS

| DE | 102010049134 A1 * | 8/2011 | ............ F25B 25/005 |
| DE | 102010049134 A1 | 8/2011 | |

(Continued)

OTHER PUBLICATIONS

European Search Report for application EP 19305923.5, dated Dec. 13, 2019, 5 pages.

(Continued)

*Primary Examiner* — Steve S Tanenbaum
(74) *Attorney, Agent, or Firm* — Cantor Colburn LLP

(57) ABSTRACT

An air handling unit (1) for cooling down an indoor airflow (A1) including at least one fan (3) circulating the indoor airflow inside the air handling unit (1) and a first and a second cooling subsystems (5, 15) including a refrigeration apparatus (50, 150) comprising an evaporator (500, 1500) and a condenser (504, 1504), a first water circuit (52, 152) connected to the condenser and comprising at least one outside heat exchanger (520, 1520) exposed to outside air (A5, A15), a second water circuit (56, 156) connected to the evaporator and comprising at least one indoor heat exchanger (560, 1560) exposed to the indoor airflow, water connection means (62, 64, 162, 164) for selectively connecting, depending on a temperature of the outside air.

9 Claims, 5 Drawing Sheets

(56) References Cited

U.S. PATENT DOCUMENTS

| | | | |
|---|---|---|---|
| 10,254,021 | B2 | 4/2019 | Mcdonnell et al. |
| 2010/0326624 | A1* | 12/2010 | Hancock .............. F24F 3/0442 165/47 |
| 2016/0265834 | A1 | 9/2016 | Chen et al. |
| 2017/0227263 | A1 | 8/2017 | Kopko |
| 2017/0241661 | A1 | 8/2017 | Erpelding et al. |
| 2017/0268792 | A1 | 9/2017 | Costakis et al. |
| 2018/0209675 | A1* | 7/2018 | Ridder .................. F24F 3/001 |
| 2018/0209701 | A1 | 7/2018 | Perrotin |

FOREIGN PATENT DOCUMENTS

| | | | |
|---|---|---|---|
| EP | 1855070 | A2 | 11/2007 |
| EP | 2233863 | A2 | 9/2010 |
| EP | 2440862 | A1 | 4/2012 |
| EP | 2102568 | B1 | 3/2016 |
| EP | 2102570 | B1 | 11/2016 |
| EP | 2102569 | B1 | 6/2017 |
| EP | 3232138 | A1 | 10/2017 |
| EP | 3351862 | A1 | 7/2018 |
| EP | 3354996 | A1 | 8/2018 |
| EP | 2464924 | B1 | 10/2018 |
| WO | 2008076120 | A1 | 6/2008 |
| WO | 2018039254 | A1 | 3/2018 |

OTHER PUBLICATIONS

Ghias, Cristian, "Potential for free-cooling by ventilation", Abstract, Solar Energy, vol. 80, Issue 4, Apr. 2006, 2 pages.

\* cited by examiner

AIR HANDLING UNIT AND METHOD FOR CONTROLLING SUCH AN AIR HANDLING UNIT

FOREIGN PRIORITY

This application claims priority to European Patent Application No. 19305923.5, Jul. 5, 2019, and all the benefits accruing therefrom under 35 U.S.C. § 119, the contents of which in its entirety are herein incorporated by reference.

BACKGROUND

The present invention concerns an air handling unit for cooling down an indoor airflow to be blown into a room of a building, and a method for controlling such an air handling unit.

Data centers are equipped with air conditioning equipment, which functions on a permanent basis to cool Information Technology (IT) equipment installed in IT spaces. To maximize the coefficient of performance (COP), free cooling is preferably used. Free cooling efficiency is generally larger than mechanical cooling (with a refrigeration apparatus). The COP of free cooling is about 15, while the COP of mechanical cooling is only about 4 to 5.

Direct introduction of outside air to the IT space is not considered due to the potential pollution of the outside air. Free cooling must be indirect. Indirect free cooling can be performed with different types of heat transfer devices, for example: air/air heat exchanger, enthalpy wheel, "Kyoto" heat exchanger, or hydronic loop.

For using outside air to indirectly cool an air stream, which is recirculated in the IT space, outside air temperature needs to be colder than the fresh air to be blown in the IT space. So that heat can be transferred between two air streams (indoor air and outside air) a temperature gradient between the two streams is required. For instance, for direct air/air heat exchange, minimum temperature gradient may be about 4-5° C. For an indoor temperature request of 22° C., "free cooling effect" can therefore be applied if ambient air temperature is lower than 18° C. If ambient temperature is above 18° C., free cooling must be replaced by a different cooling technique (for example mechanical cooling using a refrigeration apparatus).

For hydronic loop application, using air to water exchangers, this minimum temperature gradient may be as high as 8 to 10° C. (in traditional applications). For instance, 4° C. temperature gradient may be needed to transfer the heat from the IT space to the hydraulic loop. Water entering to "indoor" heat exchangers therefore needs to be at 18° C. or lower to obtain 22° C. air required for IT space.

To produce 18° C. water, 14° C. ambient air is needed (if required temperature gradient is 4° C.). Ambient air temperature therefore needs to be 14° C. or lower to produce 18° C. water.

There are generally much more operating hours with ambient air temperature below 18° C. than below 14° C. Free cooling with hydronic loops must therefore be often replaced by mechanical cooling. There is therefore a need for optimizing the efficiency of the air handling units depending on the ambient air temperature.

SUMMARY

The aim of the invention is to provide a new air handling unit which maximizes use of free cooling to improve its efficiency no matter what the outside temperature conditions are.

To this end, the invention concerns an air handling unit for cooling down an indoor airflow to be blown into a room of a building, comprising at least one fan circulating the indoor airflow inside the air handling unit, wherein the air handling unit comprises a first and a second cooling subsystems comprising each: a refrigeration apparatus comprising an evaporator and a condenser, a first water circuit connected to the condenser and comprising at least one outside heat exchanger exposed to outside air, in which the water releases heat to the outside air under action of a fan, a second water circuit connected to the evaporator and comprising at least one indoor heat exchanger exposed to the indoor airflow, in which the water draws heat from the indoor air flow, water connections linking the first water circuit and the second water circuit, water connection means for selectively connecting: the first water circuit to the condenser and the second water circuit to the evaporator and disabling the water connection, in a mechanical cooling mode where the refrigeration apparatus is operating or the first water circuit to the second water circuit and disabling water circulation in the evaporator and the condenser, in a free cooling mode where the refrigeration apparatus is stopped; wherein the at least one indoor air heat exchanger of the first cooling subsystem and the at least one indoor air heat exchanger of the second cooling subsystem are placed in series with respect to the indoor air flow, and wherein the air handling unit comprises control means for operating the mechanical cooling mode or the free cooling mode of the first cooling subsystem and the mechanical cooling mode or the free cooling mode of the second cooling subsystem depending on a temperature of the outside air.

Thanks to the invention, all free cooling, mixed mechanical and free cooling or all mechanical cooling configurations can be performed to better adapt to the ambient air temperature, with the particular advantage to have the possibility of using free cooling the perform a primary air cooling using free cooling in the most frequent temperatures interval, allowing a high annualized COP.

According to further aspects of the invention that are advantageous but not compulsory, such an air handling unit may incorporate one or several of the following features: the control means comprise a control unit controlling the water connection means and the refrigeration apparatus of each off the first and second cooling subsystems, and an outside air temperature detector. the control unit is configured to operate the air handling unit in at least three operating configurations: if the outside air temperature is below a first threshold, both the first and second cooling subsystems function in free cooling mode, if the outside air temperature is above the first threshold and below a second threshold, the first cooling subsystem functions in free cooling mode while the second cooling subsystem functions in mechanical cooling mode; if the outside air temperature is above the second threshold, both the first cooling subsystem and the second cooling subsystem function in mechanical cooling mode. the at least one outside heat exchanger of the first and second cooling subsystems are provided in a modular outside air component comprising at least one fan forcing outside air circulation through said outside heat exchangers, the refrigeration apparatuses of the first and second cooling subsystems are provided in a modular chiller component, the at least one indoor heat exchanger of the first cooling subsystem is provided in a modular inlet component comprising an air inlet, the at least one indoor heat exchanger of the second cooling subsystem is provided in a modular outlet component comprising an air outlet, the at least one fan circulating the indoor airflow inside the air handling unit is provided in a modular fan component. the modular chiller component is installed in a bottom rear side of the air handling unit, and the modular outside air component is installed in a top rear side of the air handling unit above the modular chiller component. the modular fan component is installed in a bottom front side of the air handling unit, and the modular inlet component and the modular outlet component are installed in a top front side of the air handling unit above the modular fan component, with the air inlet and the air outlet facing a front side of the air handling unit. the modular fan component is installed in a bottom front side of the air handling unit, the modular inlet component is installed in a bottom front side in front of the modular fan component and the modular outlet component is installed in a top front side of the air handling unit above the inlet component, with the air inlet and the air outlet facing a front side of the air handling unit. the at least one indoor heat exchangers and the at least one outside heat exchangers of the first and second cooling subsystems are formed by V-shaped exchangers.

The invention also concerns a method for controlling an air handling unit for cooling down an indoor airflow to be blown into a room of a building, said air handling unit comprising at least one fan circulating the indoor airflow inside the air handling unit, and a first and a second cooling subsystems comprising each: a refrigeration apparatus comprising an evaporator and a condenser, a first water circuit connected to the condenser and comprising at least one outside heat exchanger exposed to outside air, in which the water releases heat to the outside air under action of a fan, a second water circuit connected to the evaporator and comprising at least one indoor heat exchanger exposed to the indoor airflow, in which the water draws heat from the indoor air flow, water connections linking the first water circuit and the second water circuit, water connection means for selectively connecting: the first water circuit to the condenser and the second water circuit to the evaporator and disabling the water connection, in a mechanical cooling mode where the refrigeration apparatus is operating or the first water circuit to the second water circuit and disabling water circulation in the evaporator and the condenser, in a free cooling mode where the refrigeration apparatus is stopped; the at least one indoor air heat exchanger of the first cooling subsystem and the at least one indoor air heat exchanger of the second cooling subsystem being placed in series with respect to the indoor air flow, wherein the method comprises steps consisting of: if an outside air temperature is below a first threshold, operating both the first and second cooling subsystems in free cooling mode, if the outside air temperature is above the first threshold and below a second threshold, operating the first cooling subsystem in free cooling mode while operating the second cooling subsystem in mechanical cooling mode; if the outside air temperature is above the second threshold, operating both the first cooling subsystem and the second cooling subsystem in mechanical cooling mode.

DRAWING DESCRIPTION

Exemplary embodiments according to the invention and including further advantageous features of the invention are explained below, referring to the attached drawings, in which.

DETAILED DESCRIPTION

Figure 1:
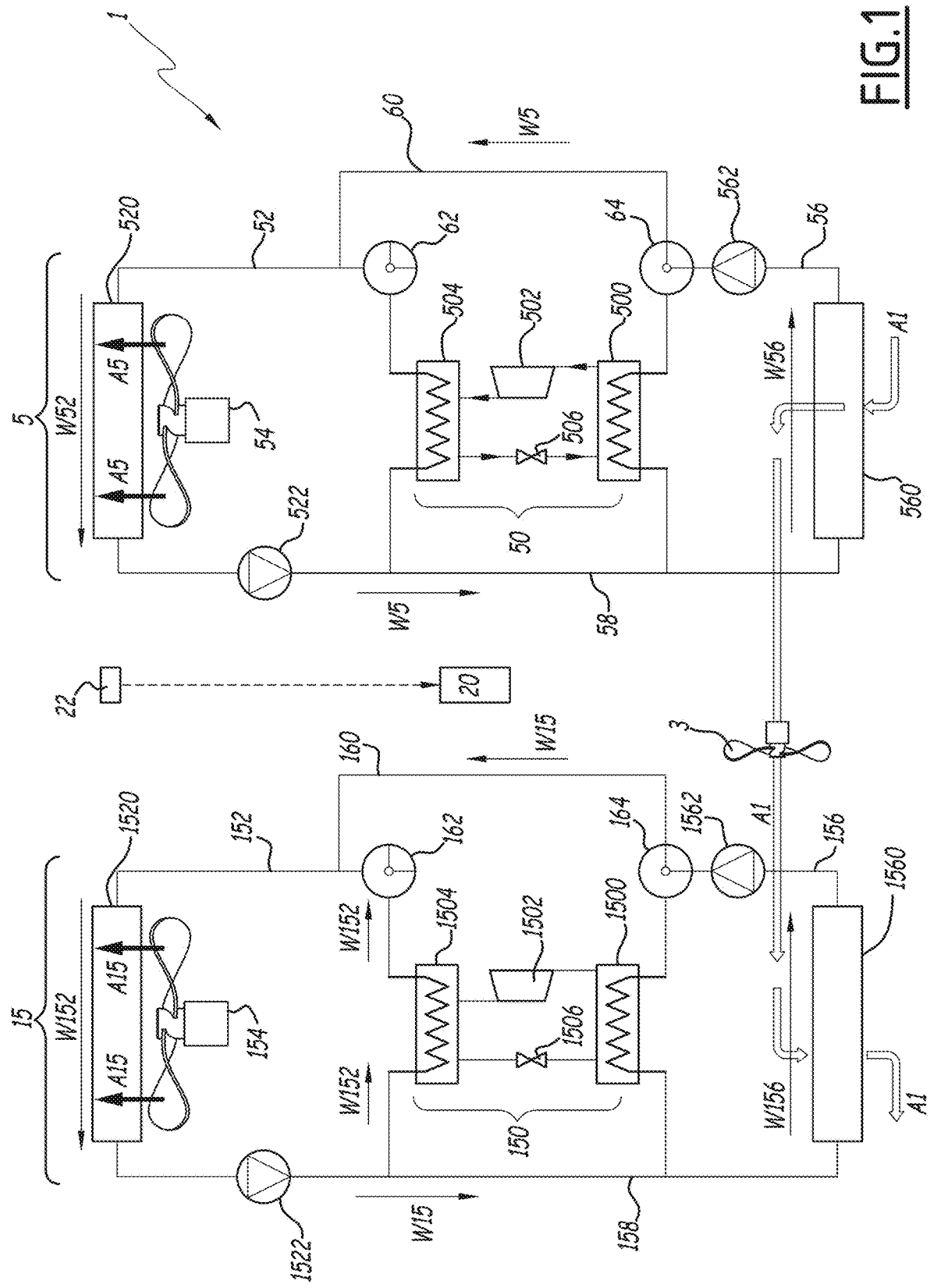
FIG. 1 is a synoptic drawing of an air handling unit according to a first embodiment of the invention, running in all free cooling configuration.
Figure 2:
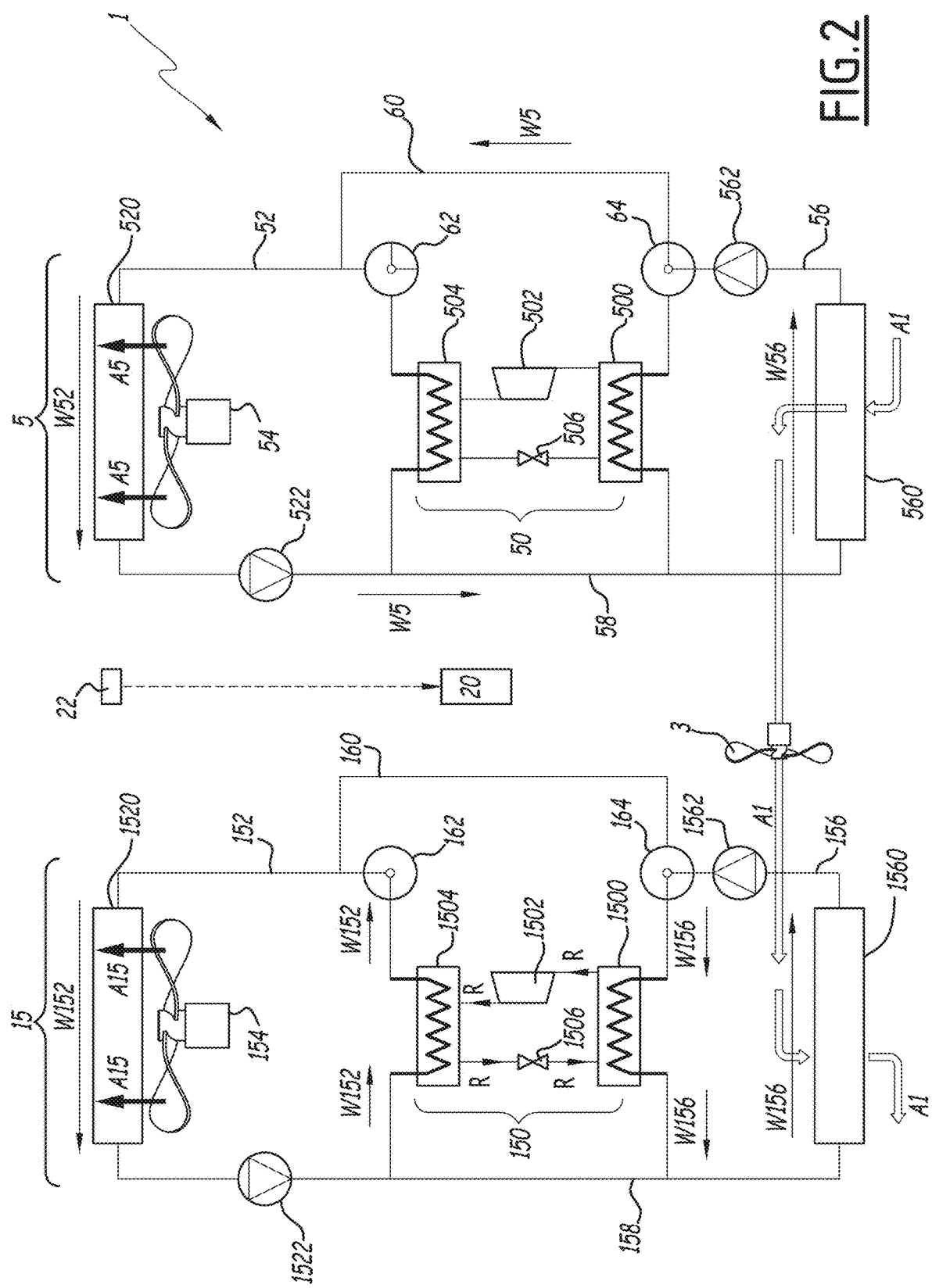
FIG. 2 is a synoptic drawing of the air handling unit of FIG. 1, running in a mixed free cooling and mechanical cooling configuration.
Figure 3:
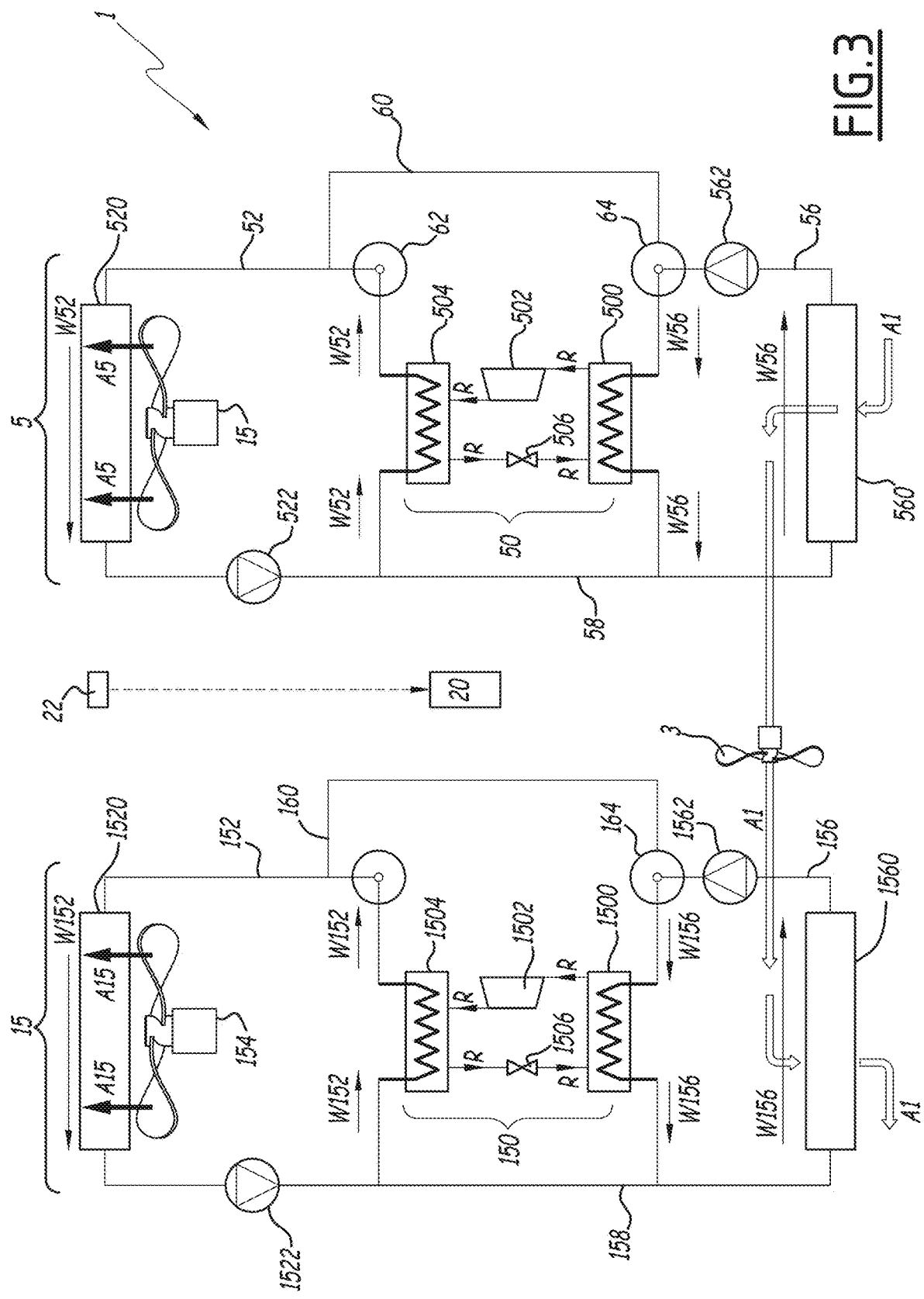
FIG. 3 is a synoptic drawing of the air handling unit of FIG. 1, running in an all mechanical cooling configuration.

FIGS. 1 to 3 represent an air handling unit 1 for cooling down an indoor airflow A1 to be blown into a room of a building, for example an IT space in a datacenter. The air handling unit 1 comprises at least one fan 3 circulating the indoor airflow A1 inside the air handling unit 1.

The air handling unit 1 comprises a first cooling subsystem 5 and a second cooling subsystem 15. Each of the cooling subsystems 5 and 15 have the same features, and only the first cooling subsystem 5 will be described in detail, the second cooling subsystem 15 having the same components with the same references comprising the added digit "1".

The first cooling subsystem 5 comprises a refrigeration apparatus 50 comprising an evaporator 500, a compressor 502, a condenser 504, and an expansion valve 506. In operation, the refrigeration apparatus 50 operates a closed-loop refrigerant circulation shown by arrows R (FIG. 3).

The first cooling subsystem 5 also comprises a first water circuit 52, or "hydronic loop", which is connected to the condenser 504 and comprises at least one outside heat exchanger 520. The first subsystem 5 comprises a fan 54, which forces an outside air flow A5 through the outside heat exchanger 520. The outside heat exchanger 520 may not be installed physically outside the air handling unit 1, but is exposed to outside air.

The water circuit 52 comprises a pump 522, which runs water circulation in the water circuit 52 as shown by arrows W52. The heat exchanger 520 being exposed to outside air, the water releases heat to the outside air under action of the fan 54 and its temperature is reduced. During circulation of water in the condenser 504, the refrigerant releases heat to the water, whose temperature increases.

The first cooling subsystem 5 also comprises a second water circuit 56 or "hydronic loop" connected to the evaporator 500 and which comprising at least one indoor heat exchanger 560 exposed to the indoor airflow A1. In the indoor heat exchanger 560, the water draws heat from the indoor air flow A1, thus increasing its temperature and cooling down the indoor air flow A1. In the evaporator 500, the water releases heat to the refrigerant, thus lowering its temperature and increasing the temperature of the refrigerant, which evaporates. The second water circuit 56 comprises a pump 562, which runs water circulation in the second water circuit 56, as shown by arrows W56.

The first cooling subsystem 5 also comprises water connections linking the first water circuit 52 and the second water circuit 56. These water connections are formed a bypass line 58 which originates between the pump 522 and the condenser 504 and terminates between the evaporator 500 and the indoor heat exchanger 560. The water connections also comprise a bypass line 60 that originates from between the pump 562 and the evaporator 500, and terminates between the condenser 504 and the outside heat exchanger 520. The lines 58 and 60 are named "bypass" due to the fact that the condenser 504 and evaporator 500 are bypassed by the water circuit formed by the coupling of the first and second water circuits 52 and 56 when water is circulated in the bypass lines 58 and 60.

The first cooling subsystem 5 further comprises water connection means for selectively connecting: the first water circuit 52 to the condenser 504 and the second water circuit 56 to the evaporator 500 and disabling the bypass lines 58 and 60, in a mechanical cooling mode or "chiller" mode, where the refrigeration apparatus 50 is operating, or the first water circuit 52 to the second water circuit 56 and disabling water circulation in the evaporator 500 and the condenser 504, in a free cooling mode, where the refrigeration apparatus 50 is stopped.

The connection means comprise a first valve 62 provided in the first water circuit 52 between the condenser 504 and the bypass line 60. In a first position (FIG. 1), the valve 62 prevents water circulation between the condenser 504 and the water circuit 52. In a second position (FIG. 3), the valve 62 allows water circulation from the condenser 504 to the water circuit 52.

The water connection means comprise a second valve 64 provided in the second water circuit 56 between the evaporator 500 and the bypass line 60. In a first position (FIG. 1), the valve 64 prevents water circulation between the pump 562 and the evaporator 500, thus directing the water of the second water circuit 56 towards the bypass line 60. In a second position (FIG. 3), the valve 64 allows water circulation from the pump 562 to the evaporator 500, thus preventing water from flowing towards the bypass line 60.

When the valves 62 and 64 are in their first position, the first and second water circuits 52 and 56 are joined in a single "hydronic loop" and the condenser 504 and the evaporator 500 are bypassed (arrows W5). When the valves 62 and 64 are in their second position, the first and second water circuits 52 and 56 each function in independent closed loops.

The indoor air heat exchanger 560 of the first cooling subsystem 5 and the indoor air heat exchanger 1560 of the second cooling subsystem 15 are placed in series with respect to the indoor air flow A1. In other words, the indoor air flow A1 passes successively first through the indoor air heat exchanger 560 then into the indoor air heat exchanger 1560. The fan 3 may be placed downstream the indoor air heat exchanger 560 and upstream the indoor air heat exchanger 1560.

The indoor air flow A1 is therefore subject to two successive cooling phases, which firstly lower the air temperature from a high temperature T1 to an intermediary temperature T2, then secondly from the intermediary temperature T2 to a low temperature T3. The high temperature T1 is the temperature at which the indoor air flow A1 is extracted from the IT space (for example 35° C.). The low temperature T3 is the temperature at which the indoor air flow A1 is blow into the IT space (for example 22° C.). The low temperature T3 is a request value calculated to allow proper functioning of the IT equipment in the IT space.

The air handling unit 1 also comprises control means for operating the mechanical cooling mode or the free cooling mode of the first cooling subsystem 5 and the mechanical cooling mode or the free cooling mode of the second cooling subsystem 15 depending on a temperature of the outside air.

Each of the first and second cooling subsystems 5 and 15 can therefore be run in a different mode to optimize cooling depending on the outside temperature conditions.

The use of hydronic loops allows very easily to convert each subsystem from free cooling mode to mechanical cooling mode. The outdoor heat exchangers 520 and 1520 can be used for both purposes: in free cooling mode as a way to reject the heat from the hydronic loops 52 and 152 respectively coupled with the hydronic loops 56 and 156, in mechanical cooling mode as a way of rejecting the heat from the condensers 504 and 1504.

The control means may comprise a control unit 20 controlling the valves 62, 64, 162, 164 with non-shown signals and the refrigeration apparatuses 50 and 150 of each off the first and second cooling subsystems 5 and 15, and an outside air temperature detector 22 sending outside temperature measurements to the control unit 20. To control the refrigeration apparatuses 50 and 150, the control unit 20 may command the start or stop of the compressors 502 and 1502 with non-shown signals.

The control unit 20 is configured to operate the air handling unit 1 in at least three operating configurations:

If the outside air temperature is below a first threshold T inf, both the first and second cooling subsystems 5 and 15 function in free cooling mode (FIG. 1), If the outside air temperature is above the first threshold T inf and below a second threshold Tmax, the first cooling subsystem 5 functions in free cooling mode while the second cooling subsystem 15 functions in mechanical cooling mode (FIG. 2);

If the outside air temperature is above the second threshold T max, both the first cooling subsystem 5 and the second cooling subsystem 15 function in mechanical cooling mode.

Such configuration allow maximizing the use of free cooling. Rather than cooling directly the indoor air flow A1 with one cooling device from the high temperature T1 to the low temperature T3, which would require a 14° C. ambient air temperature to operate in free cooling mode, the indoor air flow A1 is to cooled from the high temperature T1 to the intermediary temperature T2 by the first cooling subsystem 5 and from the intermediary temperature T2 to the low temperature T3 by the second cooling subsystem 15. For example, the intermediary temperature T2 can be set to 27° C. The cooling subsystem that has the target of 27° C. will be able to operate in free cooling mode with an ambient air temperature of 19° C. or below. This means that for ambient air temperature below the first threshold T inf, for example 14° C., the air handling unit 1 can function 100% in free cooling. For an ambient air temperature ranging from T inf to the second threshold T max, for example 19° C., the first cooling subsystem 5 uses free cooling mode. The air handling unit 1 benefits from the efficiency of free cooling in half of its capacity. For ambient air temperatures above the second threshold T max, the air handling unit 1 will operate 100% in mechanical cooling, however such a situation is marginal in view of the quantity of time in a year during which such a situation occurs. For example, for the annual temperature conditions of Paris, the mean temperature is mainly between 14° C. and 19° C. The concept of the invention gives very high annualized performance (a COP superior to 12 for Paris type ambient conditions). Overall efficiency will still be much better that operating with mechanical cooling.

More precisely, in FIG. 1, both compressors 502 and 1502 are stopped to disable the refrigeration apparatuses 50 and 150. The valves 62, 64, 162, 164 are commanded in their first position, each cooling subsystem 5 and 15 forming a water loop through the bypass lines 58, 60, 158, 160 (arrows W5 and W15). The indoor air flow A1 is cooled down to the intermediary temperature T2 by the indoor heat exchanger 560 then to the low temperature T3 by the indoor heat exchanger 1560. Water circulation in the first and second cooling subsystems 5 and 15 induces release of heat acquired by the water through the indoor heat exchangers 560 and 1560 to the ambient air via the outdoor heat exchangers 520 and 1520.

In FIG. 2, the compressor 502 is stopped, the valves 62 and 64 are in their first position. The compressor 1502 is started prompting activation of the refrigeration cycle (arrows R) of the refrigeration apparatus 150. The valves 162 and 164 are in their second position, directing the water of the water loops 152 and 156 through the condenser 1504 and the evaporator 1500. The indoor air flow A1 is cooled to the intermediary temperature T2 by free cooling, then to the low temperature T3 by mechanical cooling.

On FIG. 3, each of the refrigeration apparatuses 50 and 150 are running (arrows R), and the valves 62, 64, 162, 164 are in their second position. The indoor air flow A1 is cooled by two successive mechanical coolings.

Figure 4:
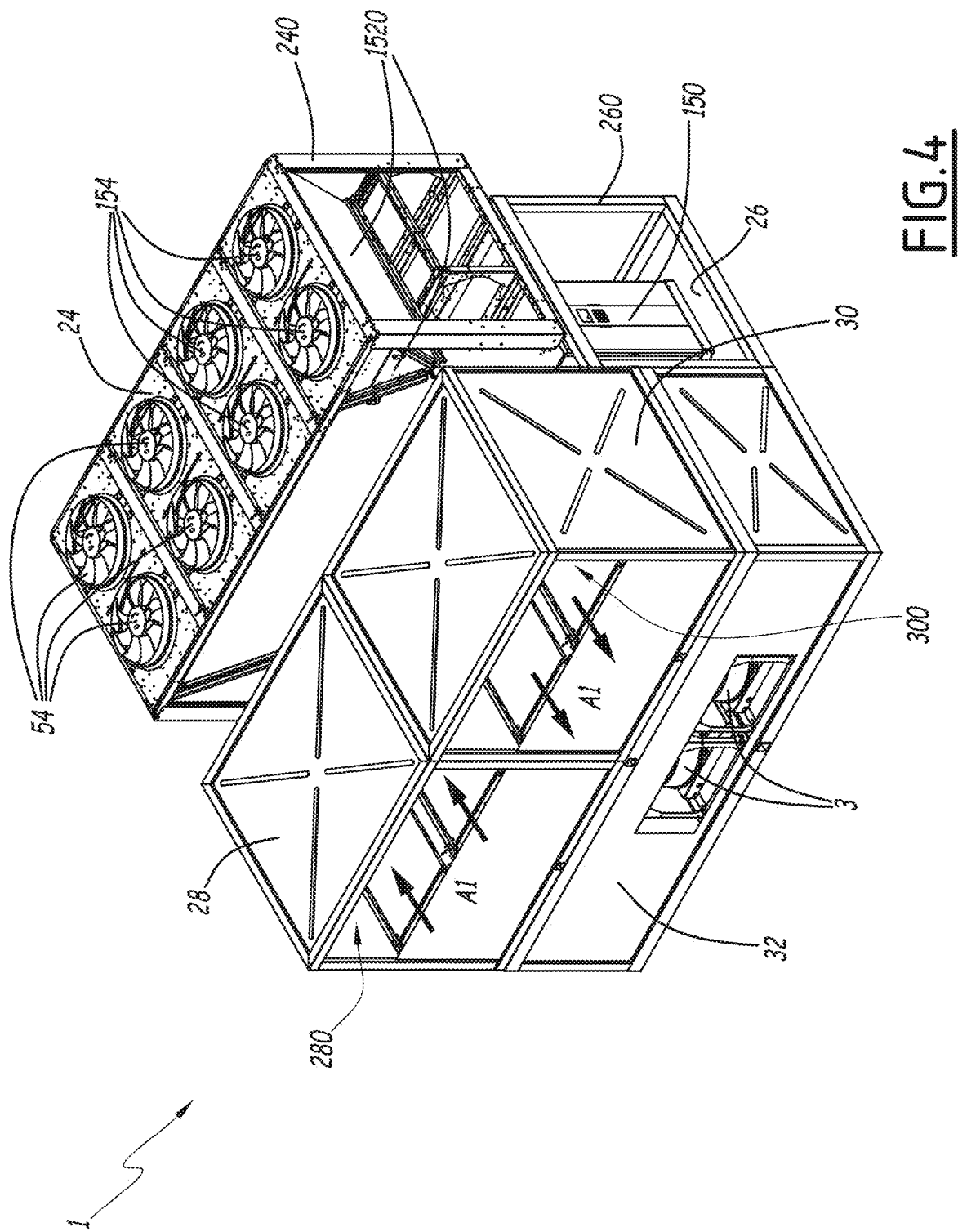
FIG. 4 is a perspective view of an air handling unit according to a second embodiment of the invention.
Figure 5:
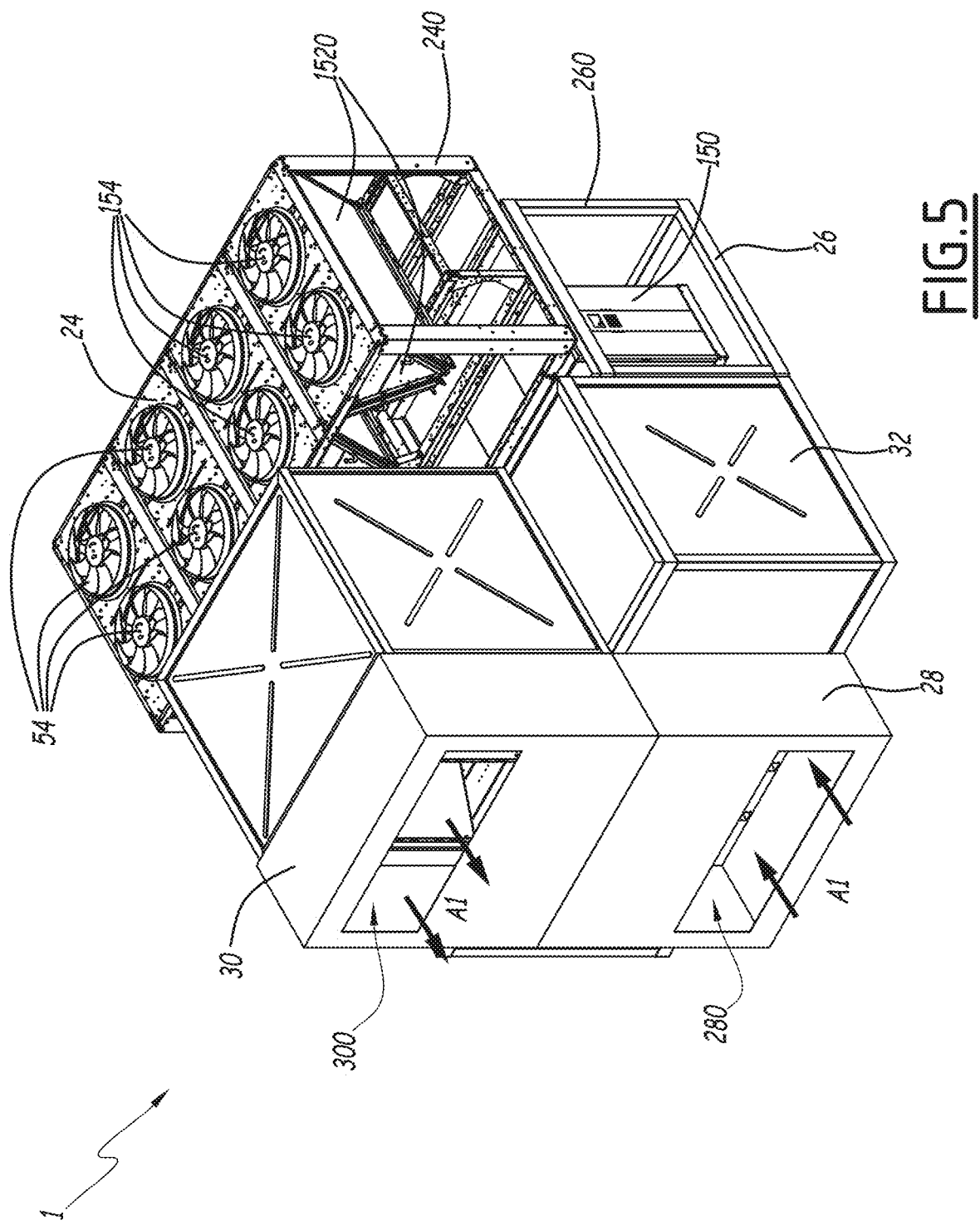
FIG. 5 is a perspective view of an air handling unit according to a third embodiment of the invention.

Other embodiments of the invention are represented on FIGS. 4 and 5. In these embodiments, elements similar to the first embodiment have the same references and work in the same way. Only the differences are detailed here after.

A second embodiment is represented on FIG. 4. In this embodiment, the outside heat exchangers 520 and 1520 are provided in a modular outside air component 24 which comprises the fans 54 and 154 forcing outside air circulation A5 and A15 through the outside heat exchangers 520 and 1520. The term "modular component" means that the component comprises a frame structure 240 in which the outside heat exchangers 520 and 1520 and the fans 54 and 154 are fixed, so that the component 24 can be transported as a whole and installed in the air handling unit 1 with ease, and with readily available water and control connections with the other parts of the air handling unit 1. Each of the first and second cooling subsystems 5 and 15 may comprise several outside fans 54 and 154 and several outside heat exchangers 520 and 1520.

The refrigeration apparatuses 50 and 150 are provided in a modular chiller component 26, which comprises a frame structure 260, and in which are fixed and connected the various elements of the refrigeration apparatuses 50 and 150.

In the embodiment of FIG. 4, the indoor heat exchanger 560 of the first cooling subsystem 5 is provided in a modular inlet component 28 comprising an air inlet 280.

The indoor heat exchanger 1560 of the second cooling subsystem 15 is provided in a modular outlet component 30 comprising an air outlet 30.

The fan 3 that runs circulation of the indoor airflow A1 inside the air handling unit 1 is provided in a modular fan component 32. The modular fan component 32 may comprise more than one fan 3.

The modular components 24, 26, 28, 30 and 32 are all interconnected with non-shown water lines and electric control lines configured to operate the water circuits and operation configuration described in relation with FIGS. 1 to 3.

The air handling unit 1 is therefore modular, in other words built from several blocks of components having different functions and that can be combined in various ways depending on the cooling needs, resulting in ease of installation and possibility of use of standard components. Application of standard components reduces the cost of the modular components and provides adaptability to various scales of cooling applications (depending for example on the size of the IT space).

The outside heat exchangers 520 and 1520, and the indoor heat exchangers 560 and 1560 are preferably V-shaped heat exchangers, formed by two water-air heat exchangers forming an angle. Application of V-shaped heat exchangers for both indoor and outside heat exchangers make the air handling unit 1 very compact compared to traditional flat water-air heat exchanger architectures. Thanks to this configuration, the thermal exchange surface area of the heat exchangers is very large, thus reducing the required temperature gradient between air and water. The V-shaped heat exchangers can therefore operate in free cooling mode with relatively high ambient air temperature.

As represented on FIG. 4, the modular chiller component 26 may be installed in a bottom rear side of the air handling unit 1, while the modular component 24 may be installed in a top rear side of the air handling unit 1 above the modular chiller component 26. The modular fan component 32 may be installed in a bottom front side of the air handling unit 1, and the modular inlet component 28 and the modular outlet component 30 be installed in a top front side of the air handling unit 1 above the modular fan component 32, with the air inlet 280 and the air outlet 300 facing a front side of the air handling unit 1.

A third embodiment is represented on FIG. 5. This embodiment differs from the embodiment of FIG. 4 in that the modular fan component 32 is installed in a bottom front side of the air handling unit 1, the modular inlet component 28 is installed in the bottom front side in front of the modular fan component 32, and the modular outlet component 30 is installed in a top front side of the air handling unit 1 above the inlet component 28. The air inlet 280 and the air outlet 300 face a front side of the air handling unit 1.

According to non-shown variants, the indoor heat exchangers 560 and 1560 may be formed by V-shaped exchangers arranged in the inlet and outlet components along a vertical or horizontal direction, the "V" formed by the exchangers being either vertical or horizontal.

According to a non-shown variant, the air handling unit 1 may comprises two modular fan components 32 are installed in a front upper side, the inlet component 28 being installed in a front bottom side, and the outlet component 30 being installed in the front upper side between the modular fan components 32 disposed laterally.

According to another non-shown variant, the modular fan components 32 may be installed in a front bottom side, the inlet component 28 being installed in a front upper side and the outlet component 30 being installed in the front bottom side between the modular fan components 32 disposed laterally, in a configuration inverted relative to the configuration described in the previous paragraph.

According to further non-shown variants of the invention: Each of the first and second cooling subsystems 5 and 15 may comprise several indoor heat exchangers 560 and 1560 and several outside heat exchangers 520 and 1520; The high, intermediate and low temperatures T1, T2 and T3 may be different depending on the needs for cooling of the IT spaces.

The technical features of the embodiments and variants described here above may be combined to form new embodiments within the scope of the claims.

What is claimed is:

1. An air handling unit for cooling down an indoor airflow to be blown into a room of a building, comprising at least one fan circulating the indoor airflow inside the air handling unit, wherein the air handling unit comprises a first and a second cooling subsystems comprising each:

a refrigeration apparatus comprising a compressor, an evaporator and a condenser, a first water circuit connected to the condenser and comprising at least one outside heat exchanger exposed to outside air, in which water releases heat to the outside air, a second water circuit connected to the evaporator and comprising at least one indoor heat exchanger exposed to the indoor airflow, in which water draws heat from the indoor air flow, water connections linking the first water circuit and the second water circuit, water connection means for selectively connecting:

the first water circuit to the condenser and the second water circuit to the evaporator and disabling the water connection, in a mechanical cooling mode where the refrigeration apparatus is operating or the first water circuit to the second water circuit and disabling water circulation in the evaporator and the condenser, in a free cooling mode where the refrigeration apparatus is stopped;

wherein the at least one indoor air heat exchanger of the first cooling subsystem and the at least one indoor air heat exchanger of the second cooling subsystem are placed in series with respect to the indoor air flow, and wherein the air handling unit comprises control means for operating the mechanical cooling mode or the free cooling mode of the first cooling subsystem and the mechanical cooling mode or the free cooling mode of the second cooling subsystem depending on a temperature of the outside air.

2. An air handling unit according to claim 1, wherein the control means comprise a control unit controlling the water connection means and the refrigeration apparatus of each of the first and second cooling subsystems, and an outside air temperature detector.

3. An air handling unit according to claim 1, wherein the at least one indoor heat exchangers and the at least one outside heat exchangers of the first and second cooling subsystems are formed by V-shaped exchangers.

4. An air handling unit according to claim 1, wherein:

the at least one outside heat exchanger of the first and second cooling subsystems are provided in a modular outside air component comprising at least one outside fan forcing outside air circulation through said outside heat exchangers, the refrigeration apparatuses of the first and second cooling subsystems are provided in a modular chiller component, the at least one indoor heat exchanger of the first cooling subsystem is provided in a modular inlet component comprising an air inlet, the at least one indoor heat exchanger of the second cooling subsystem is provided in a modular outlet component comprising an air outlet, the at least one fan circulating the indoor airflow inside the air handling unit is provided in a modular fan component.

5. An air handling unit according to claim 4, wherein the modular chiller component is installed in a bottom rear side of the air handling unit, and the modular outside air component is installed in a top rear side of the air handling unit above the modular chiller component.

6. An air handling unit according to claim 5, wherein the modular fan component is installed in a bottom front side of the air handling unit, and the modular inlet component and the modular outlet component are installed in a top front side of the air handling unit above the modular fan component, with the air inlet and the air outlet facing a front side of the air handling unit.

7. An air handling unit according to claim 5, wherein the modular fan component is installed in a bottom front side of the air handling unit, the modular inlet component is installed in a bottom front side in front of the modular fan component and the modular outlet component is installed in a top front side of the air handling unit above the inlet component, with the air inlet and the air outlet facing a front side of the air handling unit.

8. An air handling unit for cooling down an indoor airflow to be blown into a room of a building, comprising at least one fan circulating the indoor airflow inside the air handling unit, wherein the air handling unit comprises a first and a second cooling subsystems comprising each: a refrigeration apparatus comprising an evaporator and a condenser, a first water circuit connected to the condenser and comprising at least one outside heat exchanger exposed to outside air, in which water releases heat to the outside air, a second water circuit connected to the evaporator and comprising at least one indoor heat exchanger exposed to the indoor airflow, in which water draws heat from the indoor air flow, water connections linking the first water circuit and the second water circuit, water connection means for selectively connecting: the first water circuit to the condenser and the second water circuit to the evaporator and disabling the water connection, in a mechanical cooling mode where the refrigeration apparatus is operating or the first water circuit to the second water circuit and disabling water circulation in the evaporator and the condenser, in a free cooling mode where the refrigeration apparatus is stopped; wherein the at least one indoor air heat exchanger of the first cooling subsystem and the at least one indoor air heat exchanger of the second cooling subsystem are placed in series with respect to the indoor air flow, and wherein the air handling unit comprises control means for operating the mechanical cooling mode or the free cooling mode of the first cooling subsystem and the mechanical cooling mode or the free cooling mode of the second cooling subsystem depending on a temperature of the outside air; wherein the control means comprise a control unit controlling the water connection means and the refrigeration apparatus of each of the first and second cooling subsystems, and an outside air temperature detector; wherein the control unit is configured to operate the air handling unit in at least three operating configurations: if the outside air temperature is below a first threshold, both the first and second cooling subsystems function in free cooling mode, if the outside air temperature is above the first threshold and below a second threshold, the first cooling subsystem functions in free cooling mode while the second cooling subsystem functions in mechanical cooling mode; if the outside air temperature is above the second threshold, both the first cooling subsystem and the second cooling subsystem function in mechanical cooling mode.

9. A method for controlling an air handling unit for cooling down an indoor airflow to be blown into a room of a building, said air handling unit comprising at least one fan circulating the indoor airflow inside the air handling unit, and a first and a second cooling subsystems comprising each: a refrigeration apparatus comprising a compressor, an evaporator and a condenser, a first water circuit connected to the condenser and comprising at least one outside heat exchanger exposed to outside air, in which water releases heat to the outside air, a second water circuit connected to the evaporator and comprising at least one indoor heat exchanger exposed to the indoor airflow, in which water draws heat from the indoor air flow, water connections linking the first water circuit and the second water circuit, water connection means for selectively connecting: the first water circuit to the condenser and the second water circuit to the evaporator and disabling the water connection, in a mechanical cooling mode where the refrigeration apparatus is operating or the first water circuit to the second water circuit and disabling water circulation in the evaporator and the condenser, in a free cooling mode where the refrigeration apparatus is stopped; the at least one indoor air heat exchanger of the first cooling subsystem and the at least one indoor air heat exchanger of the second cooling subsystem being placed in series with respect to the indoor air flow, wherein the method comprises steps consisting of: if an outside air temperature is below a first threshold, operating both the first and second cooling subsystems in free cooling mode, if the outside air temperature is above the first threshold and below a second threshold, operating the first cooling subsystem in free cooling mode while operating the second cooling subsystem in mechanical cooling mode; if the outside air temperature is above the second threshold, operating both the first cooling subsystem and the second cooling subsystem in mechanical cooling mode.

* * * * *